Dec. 19, 1950     H. M. KROFT ET AL     2,534,918

APPARATUS FOR BALANCING ROTORS

Filed Dec. 11, 1948

WITNESSES:
Robert C. Baird
Nw. L. Groome

INVENTORS
Herbert M. Kroft &
Milton P. Vore.
BY
C. M. Avey
ATTORNEY

Patented Dec. 19, 1950

2,534,918

UNITED STATES PATENT OFFICE 2,534,918

APPARATUS FOR BALANCING ROTORS

Herbert M. Kroft, Baltimore, and Milton P. Vore, Catonsville, Md., assignors to Westinghouse Electric Corporation, East Pittsburgh, Pa., a corporation of Pennsylvania Application December 11, 1948, Serial No. 64,873

10 Claims. (Cl. 73—66)

This invention relates to apparatus for vibratory tests, particularly for testing rotors for unbalance, and is related to the invention disclosed in our copending application Serial No. 64,872, filed December 11, 1948.

For balancing a rotor by adding or subtracting material, the magnitude and angular position of the unbalance must be determined either in one plane transverse to the axis of the rotor if static balance is sufficient or in two arbitrarily chosen planes transverse to the axis if static and dynamic balance is to be achieved. To this end, the rotor, while revolving, is so supported that a radial component of the vibrations caused by unbalance is imparted to electric pickup means which translate the vibration into a corresponding voltage variation. The magnitude of the voltage variation is indicative of the unbalance magnitude or the magnitude of the required corrective mass; and the phase relation of the voltage variation to a reference voltage of a fixed phase position relative to the rotor revolution is indicative of the angular position of the unbalance or corrective mass.

In order to subject each of the two pickups only to a component in one direction of unbalance vibration, one type of known balancing equipment is so designed that the supporting structure for the rotor is capable of oscillating with only two degrees of freedom, i. e. in only one direction at each end, but is rigid as regards unbalance forces in other directions. While such a support operates satisfactorily for rotor speeds up to approximately 3600 R. P. M., we have found it infeasible to constrain the rotor bearings to only one or two degrees of freedom if higher rotor speeds, between 3600 R. P. M. and about 36,000 R. P. M. are required. At these high speeds, the supporting structure does not have the rigidity to sufficiently prevent oscillations in other than the desired direction and may develop resonance motions even in the undesired directions. Therefore, the testing and balancing accuracy at such high speeds is severely impaired.

According to another known method, the bearings for the rotor are suspended between several springs so as to be capable of vibration in all different directions, and the pickup is coupled with the bearings by structure capable of transmitting only the desired directional vibration component to the pickup. Equipment of this kind is likewise unsuitable for operation at the above-mentioned high speeds because the elastic suspension devices cause irregular resonance phenomena, often recognizable by buzzing of the equipment, which affect the accuracy. Such resonance phenomena are harmful because they introduce variable and unknown phase shifts between the force due to unbalance and the motion of the workpiece to be balanced and also introduce variable and unknown ratios between the magnitude of the unbalance and of the vibratory motion of the workpiece.

It is an object of our invention to provide a balancing apparatus that minimize or eliminate the just-mentioned deficiencies and permits testing and correcting a rotor for unbalance at high revolving frequencies, for instance, between about 3600 R. P. M. and about 36,000 R. P. M.

Another object of the invention is to devise an apparatus which, while suitable for accurately balancing high-speed rotors, require a structurally much simpler rotor support and pickup coupling than heretofore available.

In order to achieve these objects, and in accordance with our invention, we float the support for the rotor on an enclosed quantity of liquid so that the support is capable of vibratory movements in all various directions, and we determine the variations in hydraulic pressure of the enclosed liquid as a measure of the magnitude and phase angle of the vibration or unbalance component to be determined.

According to the invention, for performing the just-mentioned method, we provide a work support which is mounted on yieldable wall portions of respective containers filled with fluid, preferably liquid, such as oil. The yielding wall portion of the containers consists of rubber, plastic or the like soft material. The support mounted on the yieldable wall is capable of vibratory movement not only in any direction within the wall plane but also toward and away from the bottom of the container.

According to another feature of the invention, we dispose within the fluid an electric pressure gauge suitable to translate pressure variations into variations of an electric quantity. The fluid pressure is not affected by vibration components in the plane of the yieldable wall but varies only with vibration components normal to the yielding container wall. Consequently, the variations in fluid pressure depend only upon components of vibration in one given direction. Since the fluid pressure is the same at all points throughout the fluid, the pickup may have any location within the container. As a matter of fact, it need not even be fastened to the container, although some positioning means are desirable to prevent damage to the gauge or its electric leads during transportation and other handling. There is no rigid connection between the rotor support and the pickup, the force variations being transmitted to the gauge only through the fluid and hence determined only by the fluid pressure.

The invention will be more fully understood from the following description in conjunction with the drawing, in which.

Figure 2:
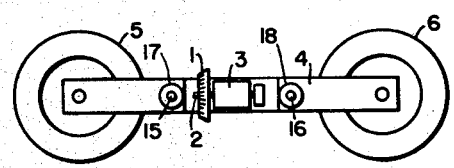
Fig. 2 is a schematic top view of the balancing apparatus of Fig. 1.
Figure 1:
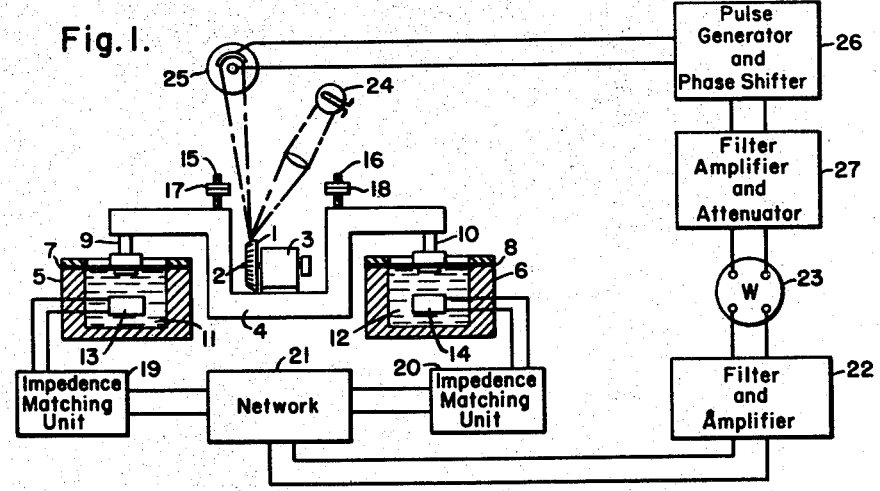
Figure 1 is a diagram of a balancing apparatus designed and operative in accordance with the invention, an example of a suitable electric measuring and indicating system being also shown schematically.

According to Figures 1 and 2 of the drawing, the rotor 1 to be tested for unbalance is mounted on the shaft 2 of the appertaining electric drive motor 3. The illustrated rotor and motor unit may be a gyroscope device of the customary type. The unit is mounted on a rigid support 4 which in turn is vibratorily mounted on two devices, each of which may be considered to represent not only a supporting member but also a pickup unit for translating mechanical vibrations into corresponding variations of an electric magnitude.

The two just-mentioned devices have each a rigid container 5 or 6 which, in the illustrated embodiment, is disposed on a rigid base. The top wall or cover of each container consists of a diaphragm or membrane 7 or 8 of yielding material, such as rubber or plastic. Mounted on each diaphragm is a connecting rod 9 or 10 on which the support 4 is mounted. The enclosed chamber of each container is completely filled with a thoroughly degassed liquid 11 or 12. This liquid consists preferably of a material not injurious to the material of the surfaces with which it is in contact. Silicone fluid, castor oil or refined kerosene are suitable for this purpose. Disposed within the liquid is an electrical pressure gauge 13 or 14 whose electric leads are carried to the outside of the container and are insulated therefrom.

In the embodiment of Figs. 1 and 2, only two containers 5, 6 and associated elements are used for supporting the structure 4 and the rotor mounted thereon. In order to maintain the rotor and its support in stable condition during the test, the supporting structure 4 is saddle-shaped, i. e. it has a sunken middle portion so that the rotor axis lies approximately in the plane of the membranes 7 and 8. If desired, the supporting bar 4 may be equipped with bolts or screws 15, 16 for receiving weights or nuts 17, 18 in order to adjust the mass distribution so that the gravity center is approximately equally spaced from rods 9 and 10, and in the plane of membranes 7 and 8.

Due to the yielding material of the supporting membranes 7 and 8, the support 4 and the rotor mounted thereon are capable of vibrating in any direction within the plane of the membranes, also twisting about an axis within the plane of either membrane and the vibrating movement may also have components normal to this plane. In other words, the two supporting pickup devices permit limited universal movements so that vibrations in various directions are transmitted from the rotor to the yielding container portion. However, the fluid pressure within each enclosed liquid is not affected by vibrations within the plane of the membrane or vibrations involving twisting of the membrane but depends only upon the components of any vibratory unbalance movement normal to the plane of the membrane. Consequently, when the rotor is revolving and, due to unbalance, causes a transmission of vibratory movements or forces to the enclosed liquids, the electric pressure gauges 13 and 14 respond only to components of motion along the axis of the connecting rods 9 and 10. In the illustrated example, the membranes 7 and 8 extend in a horizontal plane that is parallel to the axis of revolution of the rotor 1, and the two connecting rods 9 and 10 extend vertically and in a radial direction relative to the rotor axis. As a result the two gauges 13 and 14 respond only to vertical oscillations of the rotor in two axially spaced planes.

Various methods and electric apparatus are known to utilize the voltages supplied by vibration pickups for determining the degree and phase position of such vibrations, and thereby the amount and angular location of corrective masses that may have to be added or subtracted from the rotor into different axial planes for achieving dynamic balance of the rotor. In order to represent an example of an applicable method and apparatus, Fig. 1 of the drawing shows a block diagram of a system according to a wattmetric balancing method known as such from Patent 2,315,578 of J. C. Baker and described more in detail in the copending application Serial No. 613,764, filed August 31, 1945, of M. A. Treuhaft, and in the copending application Serial No. 99,245, filed June 15, 1949, of H. M. Kroft, the patent and patent applications being assigned to the assignee of the present invention.

The pressure gauges 13 and 14 are connected through respective impedance matching units 19 and 20 to an adjustable calculating network 21 for providing an output voltage indicative of the magnitude of vibration or unbalance in a correction plane chosen by the selected adjustment of the network. The network includes or is connected with a filter and amplifier 22 whose output voltage is impressed across the terminals of one of the two coils of a wattmetric or electrodynamometer type instrument 23. The action of the calculating network 21 combines the signals produced by pickups 13 and 14 in such a manner that the magnitude and phase condition of the amplified voltage applied to the instrument 23 is indicative of the unbalance in one of two selected axial planes of the rotor 1.

Impressed across the terminals of the other coil of the wattmetric instrument 23 is a reference voltage of a constant amplitude and fixed phase condition. This voltage is provided by a sine wave generator which, in the illustrated example, is of the photoelectric type. The generator includes a light source 24 whose beam of light is focused on the rotor 1 and reflected toward a phototube 25. The rotor has a spot of contrasting reflectivity which, during each revolution, passes once through the focal point of the light beam and thereby changes the output voltage of the phototube 25. This output voltage is applied to a pulse generator and phase shifter 26 which includes or is connected with a filter, amplifier and attenuator 27. The output voltage of the attenuator is applied to the instrument 23 and represents a sine wave whose frequency is determined by the speed of revolution of the rotor and whose cycle has a constant phase relation to the cycle of revolution. Due to the attenuator, the amplitude of the sinusoidal reference voltage is constant. The phase shifter permits adjusting the phase relation of the voltage to any position relative to the revolving cycle of the rotor.

A test can be performed in the following manner. The phase shifter of unit 26 is at first adjusted so that the meter 23 shows zero while the rotor 1 is revolving at constant speed. The calibration of the phase shifter now indicates a value which is indicative of the angular position of the unbalance relative to the rotor in one transverse plane. Thereafter the adjustment of the phase shifter is changed to the position in which the meter 26 indicates a maximum. This maximum is indicative of the magnitude of unbalance to be compensated in the just-mentioned plane of correction. The procedure is then repeated after network 21 has been adjusted to indicate the unbalance in the other plane of correction.

It will be understood that the just-mentioned balance measuring apparatus and method are presented only by way of example and are not part of the invention proper. Various other known apparatus and methods are likewise applied in connection with the present invention.

Instead of mounting the rotor and the appertaining supporting structure on only two quantities of liquid as described above with reference to Figs. 1 and 2, one or two additional devices may be employed if a greater stability of support is desired. Examples of such modified apparatus are illustrated in Figs. 3 and 4.

Figure 3:
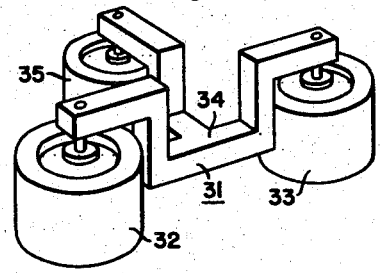
Figs. 3 and 4 are schematic and perspective illustrations of two modifications of the support and pickup structure for balancing equipment according to the invention.

In Fig. 3 the supporting bar for the rotor to be balanced is denoted by 31. It is mounted on two supporting and pickup devices 32 and 33 which are arranged and designed in accordance with the two corresponding devices 5, 6 shown in Fig. 1. That is, the devices 32 and 33 are spaced from each other in the axial direction of the rotor to be placed on the mounting surface 34 of the support 31; and each device 32 and 33 is equipped with a pressure gauge. In addition, a similar liquid-filled container 35 is provided at a place spaced from the connecting line of the devices 32 and 33 in order to provide a stable three-point support for the structure 34. The container 35 has a yieldable membrane to which the supporting structure is attached, substantially in the same way as explained above with reference to the devices 5 and 6 of Figs. 1 and 2. The interior of container 35 is also filled with liquid but it need not be equipped with a pressure gauge because the only purpose of container 35 is to provide a more stable support.

Figure 4:
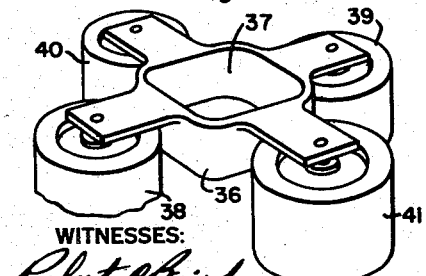

In the modification shown in Fig. 4, the supporting structure 36 for the rotor to be tested is substantially star-shaped. The supporting surface for the rotor is denoted by 37. The four arms of the structure are mounted on the connecting rods of four liquid-filled devices 38, 39, 40 and 41. The center lines of the respective devices 38 and 39 are arranged in an axial plane of the rotor to be tested, and these two devices are equipped with pressure gauges in accordance with the devices 5 and 6 of Fig. 1. The two other devices 40 and 41 serve merely to provide a stable mounting, and hence need not be equipped with pressure gauges.

Figures 5, 6:
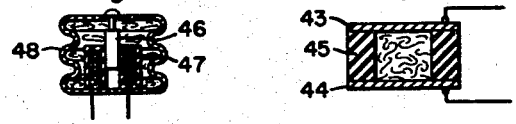
Figs. 5 and 6 show schematically two respective pickups suitable for equipment according to the invention.

The invention can be carried out with various types of pressure responsive electric gauges. For instance, capacitive, inductive, magnetostrictive, piezo electric and other devices may be employed. For instance, Fig. 5 shows schematically a capacitive pressure gauge in which two electrodes 43 and 44 are insulated from each other by a compressible structure 45. The space between electrodes is gas-filled and tightly sealed so that when the gauge is subjected to pressure, the electrodes may yield toward each other thus changing the capacitance of the gauge in dependence upon the pressure to be responded to.

Fig. 6 shows schematically an inductive type of pressure gauge applicable for our invention. According to this figure, a magnet 46 and a coil 47 are mounted on opposite sides of a compressible bellows 48 which encloses a sealed quantity of gaseous atmosphere. When subjected to pressure variation, the gauge changes the relative position of magnet and coil and issues a corresponding voltage variation. A similar gauge, if equipped with a magnetizable core instead of a magnet, produces inductance variations of the coil which can also be taken as a measure of the pressure and unbalance variation to be determined.

Figure 7:
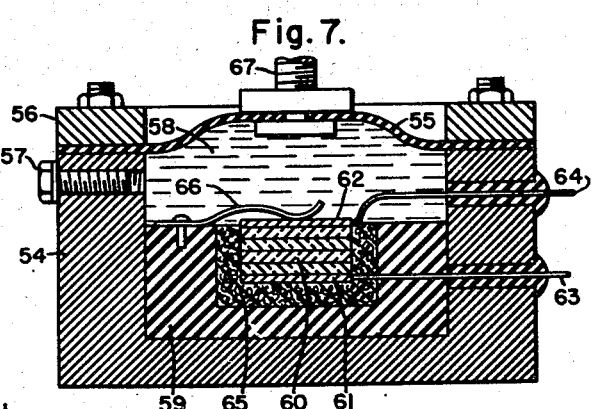
Fig. 7 is a cross-sectional view of a liquid container and crystal pickup structure also suitable for such equipment.

Another gauge applicable for methods and apparatus according to our above-mentioned invention, and corresponding to the copending application, Serial No. 64,872, is represented in Fig. 7.

According to Fig. 7, a rigid container 54 is covered by a flexible diaphragm 55 of rubber or the like yielding material which is tightly secured to the container 54 by means of a pressure ring 56 and appertaining fastening screws. The container 54 has a bore closed by a plug screw 57 which permits filling the container with liquid 58. An insulating body 59 is mounted in container 54 and has a cavity for the reception of a crystal pressure gauge which consists of a stack of crystals 60 whose end faces are covered by electrodes 61 and 62. Leads 63 and 64 are attached to the respective electrodes and are led out of the container 54 through pressure-tight and insulating bushings. The interstice 65 between the stack 60 and the walls of the cavity in body 59 is filled with resilient padding material permeable to the liquid, for instance, spun glass. The stack 60 is secured in position by means of a leaf spring 66. It will be understood that the just-mentioned fastening means serve merely to prevent excessive movement of the crystal gauge relative to the container in order to minimize damage of the crystal or the appertaining electric leads during handling of the pickup unit. If desired, the entire space within the container may be filled with a loose mass of spun glass or the like material, and the provision of the body 59 may then be unnecessary.

While in the foregoing reference is made to an arrangement of the liquid containers for response to vertical oscillations, it is obvious that the invention can also be carried out with a different arrangement so that the devices respond to vibrations in other directions.

We claim as our invention:

1. Apparatus for testing rotors for unbalance, comprising a support for the rotor to be tested, vibratory mounting means for said support comprising a container filled with liquid and having a yieldable diaphragm which forms a wall portion of said container, said support being mounted on said diaphragm so as to be capable of vibration in different directions, and an electric pressure gauge disposed in said container to respond to pressure variations of the liquid.

2. Apparatus for testing rotors for unbalance, comprising a support for the rotor to be tested, a plurality of containers filled with liquid, each container having a flexible diaphragm member which forms a wall portion of said container and having a connecting rod attached to said member and to said support and extending substantially perpendicularly to said wall portion, and an electric pressure gauge disposed in at least one of said containers to respond to pressure variations of the liquid.

3. In apparatus according to claim 2, at least one of said containers having said member extending approximately in parallel to an axial plane of said rotor and having said connecting rod extend in an approximately radial direction of said rotor.

4. Apparatus for testing rotors for unbalance, comprising a support for the rotor to be tested, two containers filled with liquid and having a yieldable wall portion, and rigid means connecting said wall portions with respective points of said support that are spaced from each other in the axial direction of the rotor, and electric pickups within said respective containers and responsive to variations of the hydraulic pressure in said containers.

5. Apparatus for testing rotors for unbalance, comprising two liquid-filled containers rigidly supported in spaced relation to each other and having respective yieldable top wall portions, two upwardly extending connecting rods attached to said respective wall portions so as to be capable of limited universal movement relative to said respective containers, a supporting bar mounted on said rods for accommodating the rotor to be tested so that the rotor axis is substantially in the plane of said rods, and electric pickups within said respective containers and responsive to variations of the hydraulic pressure in said containers.

6. In apparatus according to claim 5, said supporting bar being saddle-shaped and having a central surface disposed for accommodating said rotor and lower than the points of attachment of said bar to said rods so that bar and rotor are in stable equilibrium about said points.

7. Apparatus according to claim 5, comprising an additional liquid-filled container having a yieldable wall portion and a connecting rod attached between said wall portion and said bar for stabilizing the normal position of said bar, said latter container having said appertaining rod extend outside said plane.

8. Apparatus according to claim 4, comprising two additional containers filled with liquid and having each a yieldable wall portion and a connecting member attached to said wall portion and to said support, said additional containers being spaced from each other in a direction transverse to said axial direction.

9. Apparatus for testing rotors for unbalance, comprising a rigid supporting structure for the rotor to be tested, a plurality of liquid-filled containers having respective yieldable wall portions, said supporting structure being mounted at spaced points on said respective wall portions to be capable of limited universal motion at the points of support.

10. Apparatus according to claim 9 with at least three containers, two of said containers being spaced from each other in the axial direction of the rotor, said two containers having respective pressure-responsive electric gauges disposed within the liquid, and the other container being spaced from the connecting line of said two first-mentioned containers.

HERBERT M. KROFT.
MILTON P. VORE.

REFERENCES CITED

The following references are of record in the file of this patent:

UNITED STATES PATENTS

| Number | Name | Date |
| --- | --- | --- |
| 2,350,077 | Smith | May 30, 1944 |
| 2,451,863 | Oakley | Oct. 19, 1948 |

FOREIGN PATENTS

| Number | Country | Date |
| --- | --- | --- |
| 611,291 | France | Sept. 24, 1926 |